(12) United States Patent  (10) Patent No.: US 9,814,076 B2
Kim et al.                  (45) Date of Patent:     Nov. 7, 2017

(54) METHOD FOR PERFORMING HIGH-SPEED INITIAL ACCESS PROCESS IN WIRELESS ACCESS SYSTEM SUPPORTING ULTRAHIGH FREQUENCY BAND, AND DEVICE SUPPORTING SAME

(71) Applicant: LG ELECTRONICS INC., Seoul (KR)

(72) Inventors: Jinmin Kim, Anyang-si (KR); Kitae Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 14/760,453

(22) PCT Filed: Nov. 12, 2013

(86) PCT No.: PCT/KR2013/010243
§ 371 (c)(1),
(2) Date: Jul. 10, 2015

(87) PCT Pub. No.: WO2014/115960
PCT Pub. Date: Jul. 31, 2014

(65) Prior Publication Data
US 2015/0359003 A1     Dec. 10, 2015

Related U.S. Application Data

(60) Provisional application No. 61/757,647, filed on Jan. 28, 2013.

(51) Int. Cl.
*H04W 74/08* (2009.01)
*H04W 74/00* (2009.01)
(Continued)

(52) U.S. Cl.
CPC ... *H04W 74/0833* (2013.01); *H04W 56/0045* (2013.01); *H04W 74/008* (2013.01);
(Continued)

(58) Field of Classification Search
CPC ......... H04W 74/0833; H04W 56/0045; H04W 74/0891; H04W 74/008; H04W 56/001;
(Continued)

(56) References Cited

U.S. PATENT DOCUMENTS 9,107,173 B2 * 8/2015 Gao .................. H04W 74/004
2001/0024956 A1 9/2001 You et al.
(Continued)

FOREIGN PATENT DOCUMENTS

JP    2008-172751    7/2008
KR    10-2009-0111855    10/2009
KR    10-2011-0058883    6/2011

OTHER PUBLICATIONS

European Patent Office Application Serial No. 13872672.4, Search Report dated Sep. 6, 2016, 10 pages.
(Continued)

*Primary Examiner* — Brian O'Connor
(74) *Attorney, Agent, or Firm* — Lee Hong Degerman Kang & Waimey

(57) ABSTRACT

The present invention provides a method for performing an initial access process used in a wireless access system and in an ultrahigh frequency band, and devices supporting same. The method for performing a high-speed initial access process in a wireless access system supporting an ultrahigh frequency band, according to one embodiment of the present invention, may comprise the steps of: receiving a synchronizing signal; receiving a broadcast channel signal; generating a random access preamble by using pre-fixed physical random access parameters according to a small cell sup-
(Continued)

ported in the ultrahigh frequency band; and transmitting the generated random access preamble on the basis of the synchronizing signal and the broadcast channel signal.

14 Claims, 10 Drawing Sheets

(51) Int. Cl.
*H04L 5/00* (2006.01)
*H04W 56/00* (2009.01)
*H04W 72/04* (2009.01)
*H04W 28/18* (2009.01)

(52) U.S. Cl.
CPC ....... *H04W 74/0891* (2013.01); *H04L 5/0053* (2013.01); *H04L 5/0091* (2013.01); *H04W 28/18* (2013.01); *H04W 56/001* (2013.01); *H04W 72/042* (2013.01); *H04W 74/002* (2013.01); *H04W 74/0866* (2013.01)

(58) Field of Classification Search
CPC ........... H04W 74/002; H04W 74/0866; H04W 28/18; H04W 72/042; H04L 5/0053; H04L 5/0091
See application file for complete search history.

(56) References Cited

U.S. PATENT DOCUMENTS

| | | |
|---|---|---|
| 2011/0075629 A1 | 3/2011 | Seo et al. |
| 2012/0039284 A1* | 2/2012 | Barbieri ............... H04W 48/10 370/329 |
| 2013/0203424 A1* | 8/2013 | Van Phan ............. H04W 16/14 455/448 |
| 2014/0112254 A1* | 4/2014 | Lindoff ............... H04W 74/002 370/328 |
| 2014/0349645 A1* | 11/2014 | Webb ................... H04L 5/0091 455/435.1 |
| 2015/0319779 A1* | 11/2015 | Li ....................... H04L 27/2613 370/329 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 11)," 3GPP TR 36.321 V11.1.0, Dec. 2012, 58 pages.
3rd Generation Partnership Project (3GPP), "Technical Specification Group Radio Access Network; Evolved Universal Terrestrial Radio Access (E-UTRA); Radio Resource Control (RRC); Protocol specification (Release 9)," 3GPP TR 36.331 V9.13.0, Dec. 2012, 124 pages.
MediaTek Inc., "On Required System Functionalities for MTC UEs Operating in Enhanced Coverage Mode," 3GPP TSG-RAN WG1 #72, R1-130218, Jan. 2013, 6 pages.
Samsung,"System information structure (with TP)," 3GPP TSG-RAN WG2 #58, R2-071911, May 2007, 12 pages.
PCT International Application No. PCT/KR2013/010243, Written Opinion of the International Searching Authority dated Feb. 14, 2014, 21 pages.

* cited by examiner

METHOD FOR PERFORMING HIGH-SPEED INITIAL ACCESS PROCESS IN WIRELESS ACCESS SYSTEM SUPPORTING ULTRAHIGH FREQUENCY BAND, AND DEVICE SUPPORTING SAME

CROSS-REFERENCE TO RELATED APPLICATIONS

This application is the National Stage filing under 35 U.S.C. 371 of International Application No. PCT/KR2013/010243, filed on Nov. 12, 2013, which claims the benefit of U.S. Provisional Application No. 61/757,647, filed on Jan. 28, 2013, the contents of which are all hereby incorporated by reference herein in their entirety.

TECHNICAL FIELD

The present invention relates to a wireless access system and, more particularly, to a method for performing an initial access procedure used in an ultrahigh frequency band and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

The present invention is devised to solve the problem and an object of the present invention is to provide a method for performing an initial access procedure in an ultrahigh frequency band.

Another object of the present invention is to provide various methods for performing a random access procedure even without receiving a system information block.

Another object of the present invention is to provide various methods for generating a random access preamble even in an environment in which a system information block is not received.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention is used in a wireless access system and provides a method for performing an initial access procedure used in an ultrahigh frequency band and an apparatus supporting the same.

In an aspect of the present invention, a method for performing a fast initial access procedure in a wireless access system supporting an ultrahigh frequency band is provided. The method may include receiving a synchronization signal. receiving a broadcast channel signal, generating a Random Access Channel (RACH) preamble using prefixed Physical Random Access Channel (PRACH) parameters according to a small cell supported in the ultrahigh frequency band, and transmitting the generated RACH preamble based on the synchronization signal and the broadcast channel signal.

In another aspect of the present invention, a User Equipment (UE) for performing a fast initial access procedure in a wireless access system supporting an ultrahigh frequency band is provided. The UE may include a receiver, a transmitter, and a processor configured to perform the fast initial access procedure performed in the ultrahigh frequency band.

The processor may be configured to receive a synchronization signal and a broadcast channel signal through the receiver, generate a Random Access Channel (RACH) preamble using prefixed Physical Random Access Channel (PRACH) parameters according to a small cell supported in the ultrahigh frequency band, and transmit the generated RACH preamble based on the synchronization signal and the broadcast channel signal through the transmitter.

The PRACH parameters may include one or more of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

Cyclic shift values used to generate the RACH preamble may be selected from only an unrestricted set.

In another aspect of the present invention, a method for performing a fast initial access procedure in a wireless access system supporting an ultrahigh frequency band is provided. The method may include receiving a synchronization signal, receiving a broadcast channel signal including one or more Physical Random Access Channel (PRACH) parameters configured to be used in the ultrahigh frequency band, generating a Radom Access Channel (RACH) preamble using the synchronization signal and the broadcast channel signal, and transmitting the generated RACH preamble.

In another aspect of the present invention, a User Equipment (UE) for performing a fast initial access procedure in a wireless access system supporting an ultrahigh frequency band is provided. The UE may include a receiver, a transmitter, and a processor configured to perform the fast initial access procedure performed in the ultrahigh frequency band.

The processor may be configured to receive a synchronization signal, and a broadcast channel signal including one or more Physical Random Access Channel (PRACH) parameters configured to be used in the ultrahigh frequency band, through the receiver, generate a Radom Access Channel (RACH) preamble using the synchronization signal and the broadcast channel signal, and transmit the generated RACH preamble through the transmitter.

The one or more PRACH parameters may include at least one of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

The one or more PRACH parameters may be mapped to spare bits except for a master information block in the broadcast channel signal and then transmitted.

The PRACH frequency offset parameter may be obtained using a cell identifier detected from the synchronization signal.

The root sequence index parameter and a Zero Correlation Zone (ZCZ) configuration parameter may be obtained from a root index of the synchronization signal.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, an initial access procedure can be efficiently performed even in an ultrahigh frequency band.

Second, a random access preamble used in a random access procedure can be generated even without an operation of receiving a system information block in an existing initial access procedure. Therefore, a fast random access procedure can be performed.

Third, the UE can efficiently transmit and receive data by accessing an eNB faster.

Fourth, overall cell throughput can be improved using the embodiments of the present invention.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
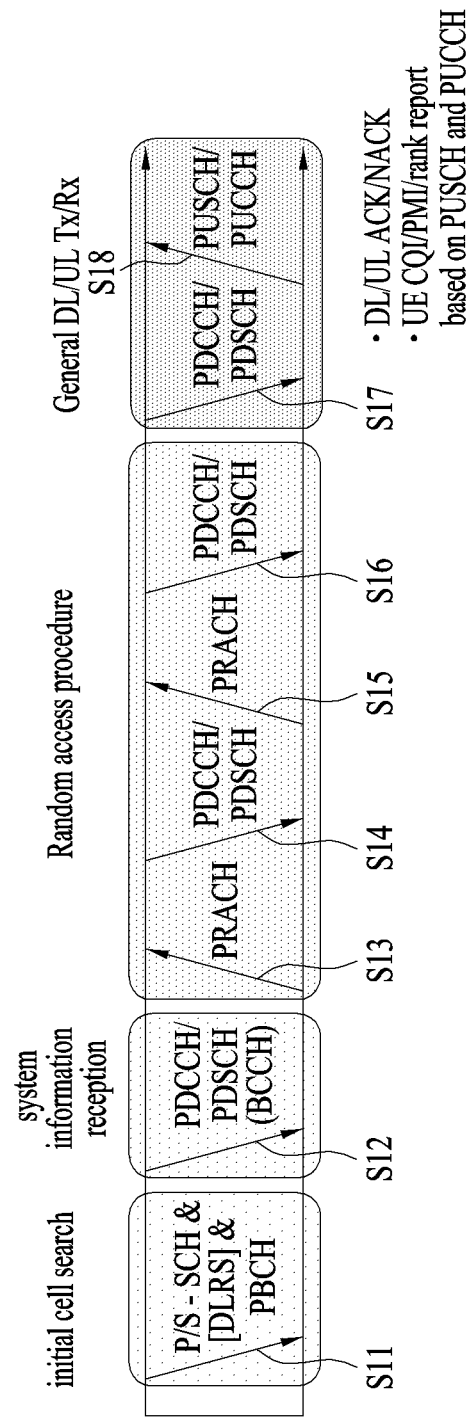
FIG. 1 illustrates physical channels and a general signal transmission method using the physical channels, which may be used in embodiments of the present invention.

The embodiments of the present invention described below provide a method for newly defining a synchronization signal used in an ultrahigh frequency band and acquiring DL synchronization using the synchronization signal, and an apparatus supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted periodically on the PUSCH, upon receipt of a request/command from a network.

Figure 2:
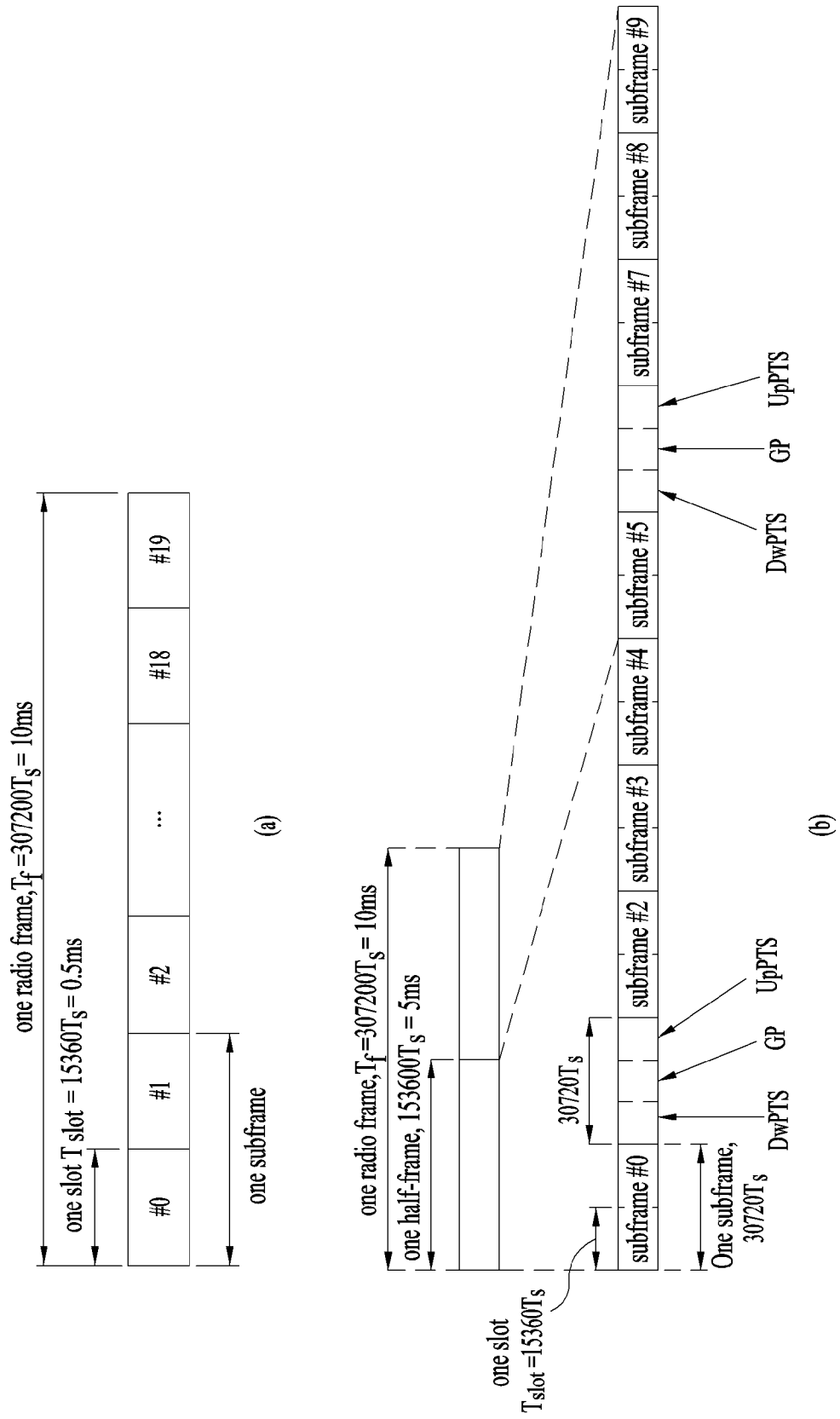
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
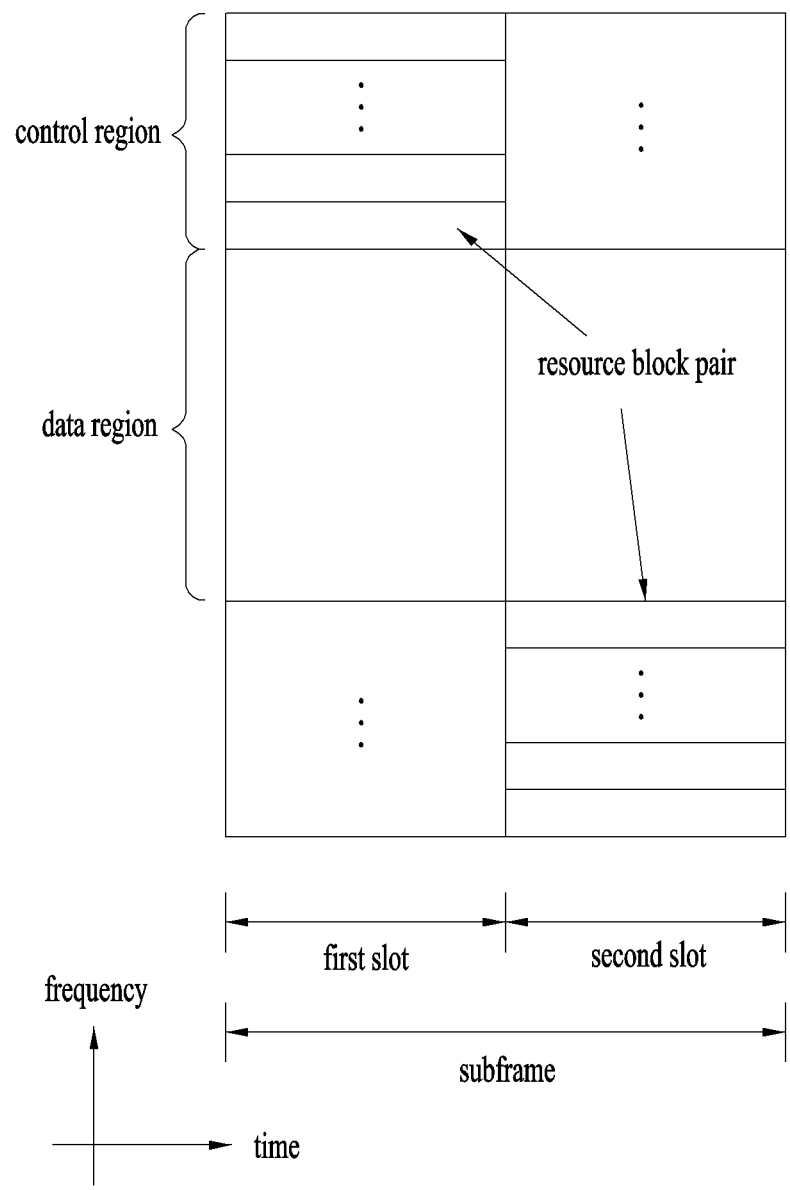
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
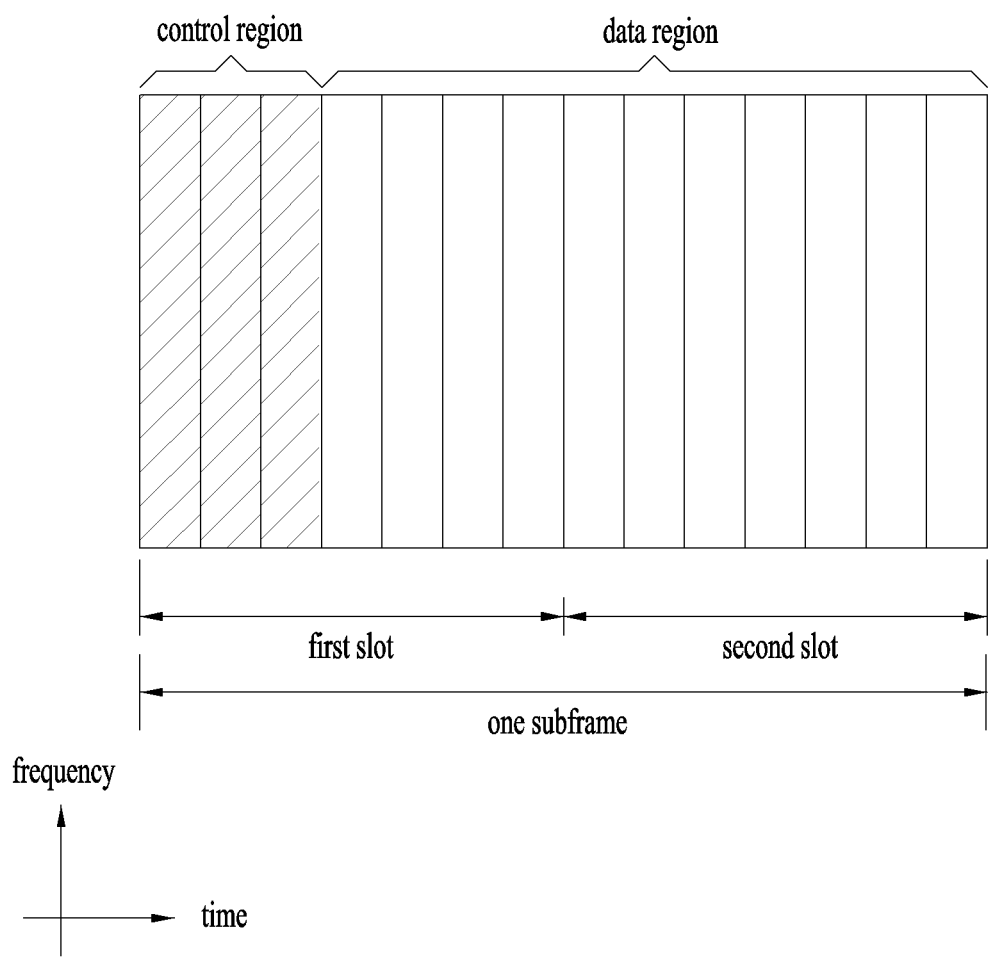
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
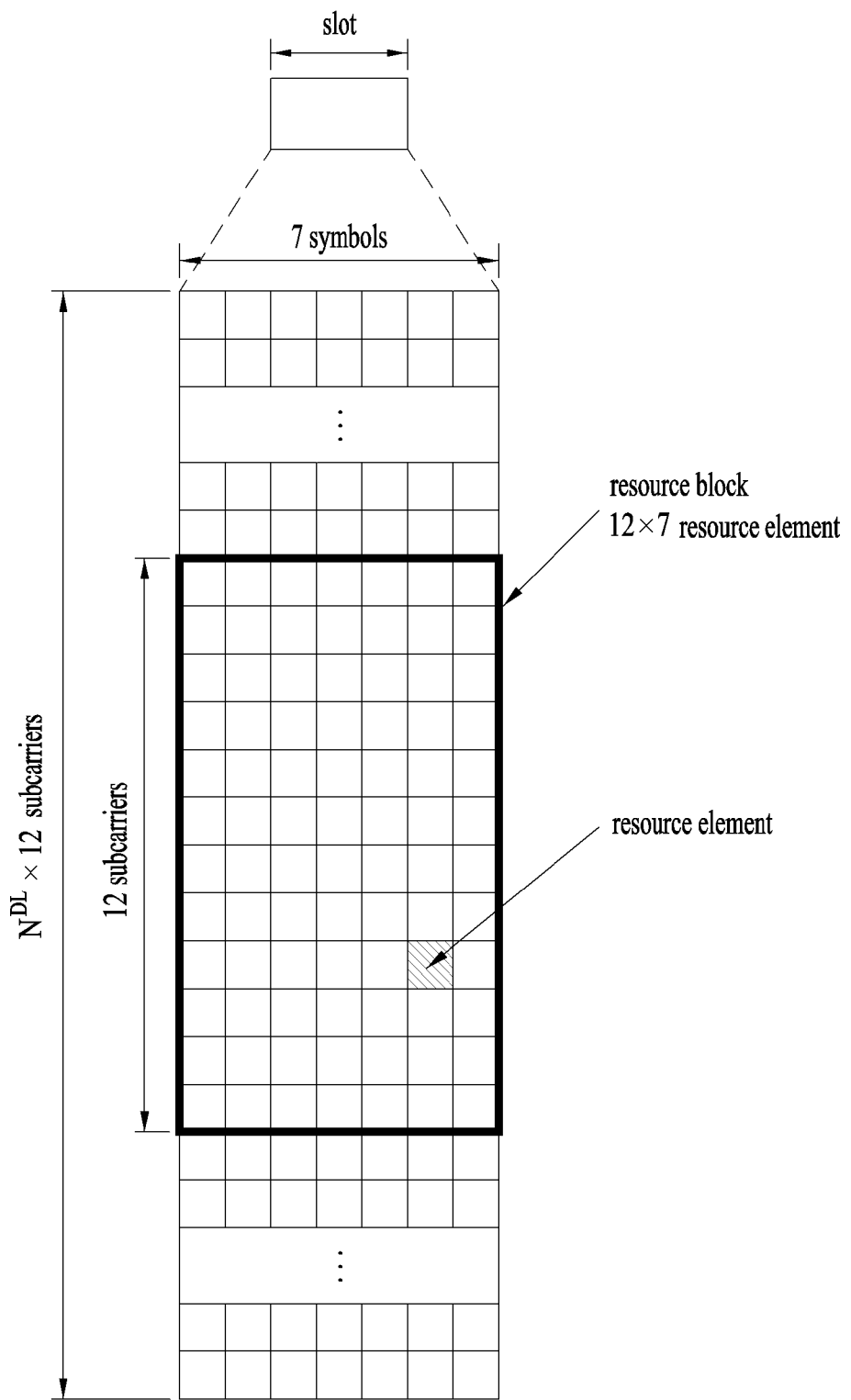
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
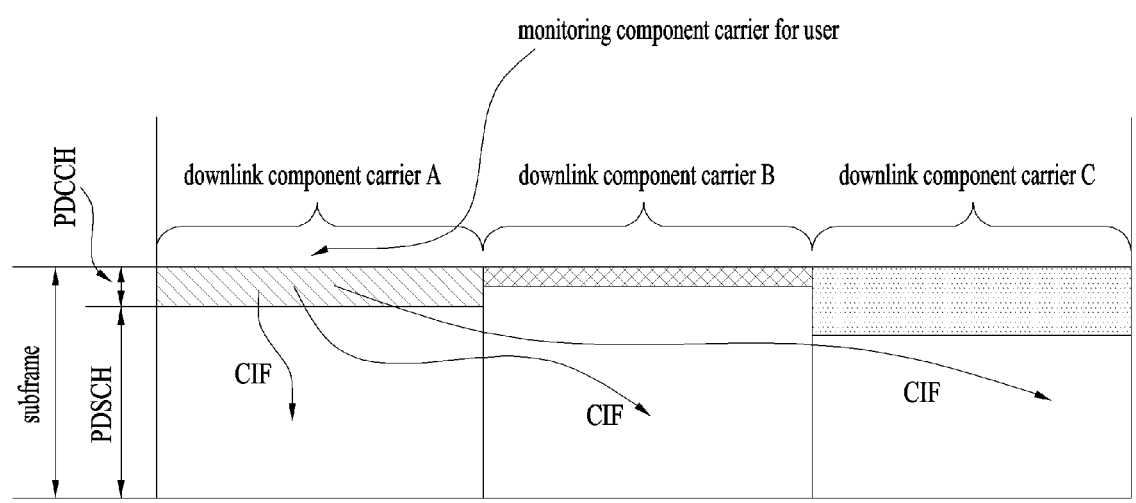
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Random Access Procedure 3.1 Contention-Based Random Access Procedure

Figure 7:
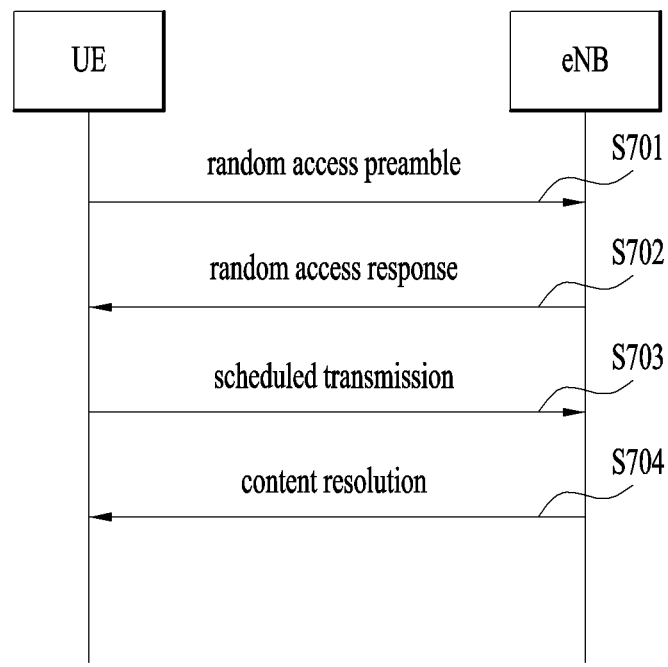
FIG. 7 is a diagram illustrating a signal flow for an operation between a User Equipment (UE) and an evolved Node B (eNB) in a contention-based random access procedure.

FIG. 7 illustrates an operation performed between a UE and an eNB in a contention-based random access procedure.

(1) Transmission of First Message (Msg1)

First, the UE may randomly select a random access preamble from a set of random access preambles indicated by system information or a Handover Command message, select Physical RACH (PRACH) resources, and transmit the selected random access preamble in the PRACH resources to the eNB (S701).

(2) Reception of Second Message (Msg2)

After transmitting the random access preamble in step S701, the UE attempts to receive a random access response within a random access response reception window indicated by the system information or the Handover Command message from the eNB (S702).

Random access response information may be transmitted in a Medium Access Control (MAC) Packet Data Unit (PDU) and the MAC PDU may be transmitted on a PDSCH in step S702. To receive information on the PDSCH successfully, the UE preferably monitors a Physical Downlink Control Channel (PDCCH). The PDCCH may deliver information about a UE to receive the PDSCH, time and frequency information about radio resources of the PDSCH, and information about the transport format of the PDSCH. Once the UE successfully receives the PDCCH directed to it, the UE may appropriately receive a random access response on the PDSCH based on information of the PDCCH. The random access response may include a Random Access Preamble Identifier (RAPID), an UpLink (UL) Grant indicating UL radio resources, a temporary Cell-Radio Network Temporary Identifier (C-RNTI), and a Timing Advance Command (TAC).

The reason for including an RAPID in the random access response is that one random access response may include random access response information for one or more UEs and thus it is necessary to indicate a UE for which the UL Grant, the temporary C-RNTI, and the TAC are valid. Herein, it is assumed that the UE selects an RAPID matching the random access preamble selected by the UE in step S701.

(3) Transmission of Third Message (Msg 3)

If the UE receives a random access response valid for it, the UE processes information included in the random access response. That is, the UE applies the TAC and stores the temporary C-RNTI. In addition, the UE may store data to be transmitted in response to the reception of the valid random access response in an Msg 3 buffer.

Meanwhile, the UE transmits data (i.e., a third message) to the eNB based on the received UL Grant (S703).

The third message should include an ID of the UE. In the contention-based random access procedure, the eNB may not determine which UE is performing the random access procedure and should identify the UE to resolve collision later.

(4) Reception of Fourth Message (Msg 4)

After transmitting the data including its ID based on the UL Grant included in the random access response, the UE awaits reception of a command from the eNB, for contention resolution. That is, the UE attempts to receive a PDCCH, for reception of a specific message (S704).

From the perspective of the physical layer, a Layer 1 (L1) random access procedure refers to transmission and reception of a random access preamble and a random access response in steps S701 and S702. The other messages are transmitted on a shared data channel by a higher layer, which is not considered to fall into the L1 random access procedure.

An RACH is configured to a size of 6 RBs in one or more contiguous subframes reserved for transmission of a random access preamble. The L1 random access procedure is triggered by a preamble transmission request from a higher layer. A preamble index, a target preamble reception power PREAMBLE_RECEIVED_TARGET_POWER, a matching RA-RNTI, and PRACH resources are part of the preamble transmission request, indicated by the higher layer.

Preamble transmission power $P_{PRACH}$ is calculated by [Equation 1].

$$P_{PRACH}=\min\{P_{CMAX,c}(i),\text{PREAMBLE\_RECEIVED\_TARGET\_POWER}+PL_c\}\_[dBm] \quad \text{[Equation 1]}$$

In [Equation 1], $P_{CMAX,c}(i)$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power $P_{PRACH}$ using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

3.2 Contention-Free Random Access Procedure

Figure 8:
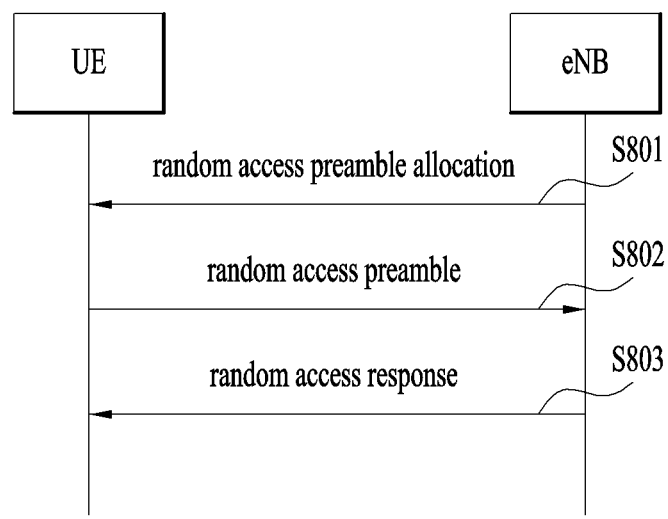
FIG. 8 is a diagram illustrating a signal flow for an operation between a UE and an eNB in a contention-free random access procedure.

FIG. 8 illustrates an operation between a UE and an eNB in a contention-free random access procedure.

Compared to the contention-based random access procedure illustrated in FIG. 8, the contention-free random access procedure ends simply by transmitting the first and second messages. However, before a UE transmits a random access preamble as a first message to an eNB, the eNB allocates the random access preamble to the UE. Then the UE transmits the random access preamble as the first message to the eNB and receives a random access response from the eNB. Thus, the random access procedure ends.

The contention-free random access procedure may be performed in the event of handover or upon request by a command from the eNB. In both cases, the contention-based random access procedure may also be performed.

Referring to FIG. 8, the eNB allocates a dedicated random access preamble that is not likely to collide to the UE, for the contention-free random access procedure. For example, the eNB may indicate the random access preamble to the UE by a Handover Command or a PDCCH order (S801).

The UE transmits the allocated dedicated random access preamble as the first message to the eNB and receives a random access response message in response to the random access preamble from the eNB. Random access response information is received in the same manner as in the contention-based random access procedure illustrated in FIG. 8 (S802 and S803).

3.3 PRACH Preamble

A detailed description will be given of the structure of a PRACH preamble transmitted on an RACH.

Figure 9:
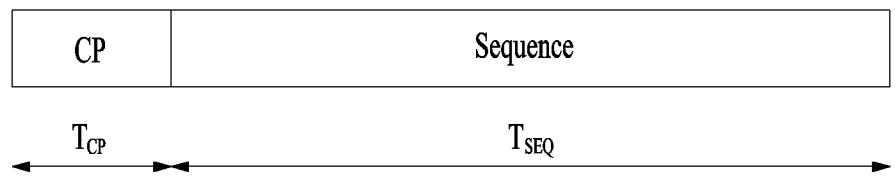
FIG. 9 illustrates an exemplary Physical Random Access Channel (PRACH) preamble that may be used in embodiments of the present invention.

FIG. 9 illustrates an exemplary PRACH preamble that may be used in embodiments of the present invention.

Referring to FIG. 9, the PRACH preamble is divided into a Cyclic Prefix (CP) of length $T_{CP}$ and a sequence of length $T_{SEQ}$. Parameters for the CP and the sequence are determined according to a frame structure and a random access configuration. [Table 2] lists CPs ($T_{CP}$) and sequences ($T_{SEQ}$) for different preamble formats.

TABLE 2

| Preamble format | $T_{CP}$ | $T_{SEQ}$ |
| --- | --- | --- |
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

Transmission of a random access preamble is confined to specific time and frequency resources in frame structure type 2 and a specific subframe including a UpTPS. These resources are arranged in an ascending order of subframe numbers in a radio frame, starting from a PRB having the lowest index corresponding to index 0 in a frequency area. PRACH resources within radio resources are indicated by PRACH resource indexes in the order illustrated in [Table 3] and [Table 4].

For frame structure type 1, preamble formats 0 to 3 are used. One random access resource per subframe at maximum is provided. [Table 3] lists subframes carrying allowed random access preambles for the preamble formats listed in [Table 2] and given configurations of frame structure type 1. A PRACH configuration index parameter, prach-ConfiguraitonIndex is indicated by a higher layer. The start of a random access preamble is adjusted to the start of a UL subframe in which a UE estimates $N_{TA}=0$. $N_{TA}$ is a time offset between a UL radio frame and a DL radio frame.

For PRACH configurations 0, 1, 2, 15, 16, 17, 18, 31, 32, 33, 34, 47, 48, 49, 50, and 63, a UE that will perform handover may estimate the absolute value of a relative time offset of radio frame j between a serving cell and a target cell to be less than $153600 \cdot T_s$. The first PRB $n_{PRB}^{RA}$ allocated to a PRACH opportunity considered for preamble formats 0, 1, 2, and 3 is defined as $n_{PRB}^{RA}=n_{PRB\ offset}^{RA}$. Herein, a PRACH frequency offset parameter, prach-FrequencyOFfset $n_{PRBoffset}^{RA}$ is expressed as a PRB number configured by a higher layer, satisfying $0 \leq n_{PRBoffset}^{RA} \leq N_{RB}^{UL}-6$.

[Table 3] illustrates a mapping relationship among PRACH configuration indexes, preamble formats, system frame numbers, and subframe numbers.

TABLE 3

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |

TABLE 3-continued

| PRACH Configuration Index | Preamble Format | System frame number | Subframe number |
|---|---|---|---|
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For preamble formats 0 to 4 of frame structure type 2, a plurality of random access resources may exist in a UL frame according to a UL/DL configuration. [Table 4] below illustrates combinations of a preamble format, a PRACH density value $D_{RA}$, and a version index $r_{RA}$ with respect to PRACH configuration indexes available in frame structure type 2. A PRACH configuration index parameter, PrachConfigurationIndex is given by a higher layer. For frame structure type 2 of PRACH configurations 0, 1, 2, 20, 21, 22, 30, 31, 32, 40, 41, 42, 48, 49, and 50 or PRACH configurations 51, 53, 54, 55, 56, and 57 in UL/DL configurations 3, 4, and 5, a UE that will perform handover may estimate the absolute value of a relative time offset of radio frame j between a serving cell and a target cell to be less than $153600 \cdot T_s$.

TABLE 4

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

[Table 5] below illustrates mapping of physical resources to other random access opportunities needed for a specific PRACH density $D_{RA}$.

TABLE 5

| PRACH configuration Index (refer to Table 4) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |

TABLE 5-continued

| PRACH configuration Index (refer to Table 4) | UL/DL configuration (See Table 4.2-2) | | | | | | |
|---|---|---|---|---|---|---|---|
| | 0 | 1 | 2 | 3 | 4 | 5 | 6 |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) | (0, 0, 0, 1) | (0, 0, 0, 0) | (0, 0, 0, 0) | (0, 0, 0, 0) | (0, 0, 0, 0) | (0, 0, 0, 2) |
| | (0, 0, 1, 2) | (0, 0, 1, 1) | (0, 0, 1, 0) | (0, 0, 0, 2) | (0, 0, 0, 1) | (1, 0, 0, 0) | (0, 0, 1, 1) |
| 7 | (0, 0, 0, 1) | (0, 0, 0, 0) | N/A | (0, 0, 0, 0) | N/A | N/A | (0, 0, 0, 1) |
| | (0, 0, 1, 1) | (0, 0, 1, 0) | | (0, 0, 0, 2) | | | (0, 0, 1, 0) |
| 8 | (0, 0, 0, 0) | N/A | N/A | (0, 0, 0, 0) | N/A | N/A | (0, 0, 0, 0) |
| | (0, 0, 1, 0) | | | (0, 0, 0, 1) | | | (0, 0, 1, 1) |
| 9 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) |
| | (0, 0, 1, 2) | (0, 0, 1, 1) | (1, 0, 0, 0) | (0, 0, 0, 2) | (1, 0, 0, 1) | (2, 0, 0, 0) | (0, 0, 1, 1) |
| 10 | (0, 0, 0, 0) | (0, 0, 0, 1) | (0, 0, 0, 0) | N/A | (0, 0, 0, 0) | N/A | (0, 0, 0, 0) |
| | (0, 0, 1, 0) | (0, 0, 1, 0) | (0, 0, 1, 0) | | (0, 0, 0, 1) | | (0, 0, 0, 2) |
| | (0, 0, 1, 1) | (0, 0, 1, 1) | (1, 0, 1, 0) | | (1, 0, 0, 0) | | (0, 0, 1, 0) |
| 11 | N/A | (0, 0, 0, 0) | N/A | N/A | N/A | N/A | (0, 0, 0, 1) |
| | | (0, 0, 0, 1) | | | | | (0, 0, 1, 0) |
| | | (0, 0, 1, 0) | | | | | (0, 0, 1, 1) |
| 12 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) |
| | (0, 0, 1, 1) | (0, 0, 1, 0) | (1, 0, 0, 0) | (0, 0, 0, 2) | (1, 0, 0, 0) | (2, 0, 0, 0) | (0, 0, 1, 0) |
| | (0, 0, 1, 2) | (0, 0, 1, 1) | (1, 0, 1, 0) | (1, 0, 0, 2) | (1, 0, 0, 1) | (3, 0, 0, 0) | (0, 0, 1, 1) |
| 13 | (0, 0, 0, 0) | N/A | N/A | (0, 0, 0, 0) | N/A | N/A | (0, 0, 0, 0) |
| | (0, 0, 0, 2) | | | (0, 0, 0, 1) | | | (0, 0, 0, 1) |
| | (0, 0, 1, 0) | | | (0, 0, 0, 2) | | | (0, 0, 0, 2) |
| | (0, 0, 1, 2) | | | (1, 0, 0, 1) | | | (0, 0, 1, 1) |
| 14 | (0, 0, 0, 0) | N/A | N/A | (0, 0, 0, 0) | N/A | N/A | (0, 0, 0, 0) |
| | (0, 0, 0, 1) | | | (0, 0, 0, 1) | | | (0, 0, 0, 2) |
| | (0, 0, 1, 0) | | | (0, 0, 0, 2) | | | (0, 0, 1, 0) |
| | (0, 0, 1, 1) | | | (1, 0, 0, 0) | | | (0, 0, 1, 1) |
| 15 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) |
| | (0, 0, 1, 1) | (0, 0, 1, 1) | (1, 0, 1, 0) | (1, 0, 0, 1) | (1, 0, 0, 1) | (3, 0, 0, 0) | (0, 0, 1, 0) |
| | (0, 0, 1, 2) | (1, 0, 0, 1) | (2, 0, 0, 0) | (1, 0, 0, 2) | (2, 0, 0, 1) | (4, 0, 0, 0) | (0, 0, 1, 1) |
| 16 | (0, 0, 0, 1) | (0, 0, 0, 0) | (0, 0, 0, 0) | (0, 0, 0, 0) | (0, 0, 0, 0) | N/A | N/A |
| | (0, 0, 0, 2) | (0, 0, 0, 1) | (0, 0, 1, 0) | (0, 0, 0, 1) | (0, 0, 0, 1) | | |
| | (0, 0, 1, 0) | (0, 0, 1, 0) | (1, 0, 0, 0) | (0, 0, 0, 2) | (1, 0, 0, 0) | | |
| | (0, 0, 1, 1) | (0, 0, 1, 1) | (1, 0, 1, 0) | (1, 0, 0, 0) | (1, 0, 0, 1) | | |
| | (0, 0, 1, 2) | (1, 0, 1, 1) | (2, 0, 1, 0) | (1, 0, 0, 2) | (2, 0, 0, 0) | | |
| 17 | (0, 0, 0, 0) | (0, 0, 0, 0) | N/A | (0, 0, 0, 0) | N/A | N/A | N/A |
| | (0, 0, 0, 1) | (0, 0, 0, 1) | | (0, 0, 0, 1) | | | |
| | (0, 0, 0, 2) | (0, 0, 1, 0) | | (0, 0, 0, 2) | | | |
| | (0, 0, 1, 0) | (0, 0, 1, 1) | | (1, 0, 0, 0) | | | |
| | (0, 0, 1, 2) | (1, 0, 0, 0) | | (1, 0, 0, 1) | | | |
| 18 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) |
| | (0, 0, 1, 0) | (0, 0, 1, 1) | (1, 0, 1, 0) | (1, 0, 0, 0) | (1, 0, 0, 1) | (3, 0, 0, 0) | (0, 0, 1, 0) |
| | (0, 0, 1, 1) | (1, 0, 0, 1) | (2, 0, 0, 0) | (1, 0, 0, 1) | (2, 0, 0, 0) | (4, 0, 0, 0) | (0, 0, 1, 1) |
| | (0, 0, 1, 2) | (1, 0, 1, 1) | (2, 0, 1, 0) | (1, 0, 0, 2) | (2, 0, 0, 1) | (5, 0, 0, 0) | (1, 0, 0, 2) |
| 19 | N/A | (0, 0, 0, 0) | N/A | N/A | N/A | N/A | (0, 0, 0, 0) |
| | | (0, 0, 0, 1) | | | | | (0, 0, 0, 1) |
| | | (0, 0, 1, 0) | | | | | (0, 0, 0, 2) |
| | | (0, 0, 1, 1) | | | | | (0, 0, 1, 0) |
| | | (1, 0, 0, 0) | | | | | (0, 0, 1, 1) |
| | | (1, 0, 1, 0) | | | | | (1, 0, 1, 1) |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| 26/36 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| 27/37 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| 28/38 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |

TABLE 5-continued

| PRACH configuration Index (refer to Table 4) | UL/DL configuration (See Table 4.2-2) | | | | | | |
|---|---|---|---|---|---|---|---|
| | 0 | 1 | 2 | 3 | 4 | 5 | 6 |
| 29/39 | (1, 0, 1, 1)<br>(2, 0, 0, 1)<br>(0, 0, 0, 1)<br>(0, 0, 1, 1)<br>(1, 0, 0, 1)<br>(1, 0, 1, 1)<br>(2, 0, 0, 1)<br>(2, 0, 1, 1) | (1, 0, 1, 0)<br>(2, 0, 0, 0)<br>(0, 0, 0, 0)<br>(0, 0, 1, 0)<br>(1, 0, 0, 0)<br>(1, 0, 1, 0)<br>(2, 0, 0, 0)<br>(2, 0, 1, 0) | N/A | (3, 0, 0, 1)<br>(4, 0, 0, 1)<br>(0, 0, 0, 1)<br>(1, 0, 0, 1)<br>(2, 0, 0, 1)<br>(3, 0, 0, 1)<br>(4, 0, 0, 1)<br>(5, 0, 0, 1) | (3, 0, 0, 0)<br>(4, 0, 0, 0)<br>(0, 0, 0, 0)<br>(1, 0, 0, 0)<br>(2, 0, 0, 0)<br>(3, 0, 0, 0)<br>(4, 0, 0, 0)<br>(5, 0, 0, 0) | N/A | (1, 0, 1, 0)<br>(2, 0, 0, 1)<br>(0, 0, 0, 1)<br>(0, 0, 1, 0)<br>(1, 0, 0, 1)<br>(1, 0, 1, 0)<br>(2, 0, 0, 1)<br>(2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0)<br>(0, 0, 1, 0) | N/A | N/A | (0, 0, 0, 0)<br>(1, 0, 0, 0) | N/A | N/A | (0, 0, 0, 0)<br>(1, 0, 0, 0) |
| 46 | (0, 0, 0, 0)<br>(0, 0, 1, 0)<br>(1, 0, 0, 0) | N/A | N/A | (0, 0, 0, 0)<br>(1, 0, 0, 0)<br>(2, 0, 0, 0) | N/A | N/A | (0, 0, 0, 0)<br>(1, 0, 0, 0)<br>(2, 0, 0, 0) |
| 47 | (0, 0, 0, 0)<br>(0, 0, 1, 0)<br>(1, 0, 0, 0)<br>(1, 0, 1, 0) | N/A | N/A | (0, 0, 0, 0)<br>(1, 0, 0, 0)<br>(2, 0, 0, 0)<br>(3, 0, 0, 0) | N/A | N/A | (0, 0, 0, 0)<br>(1, 0, 0, 0)<br>(2, 0, 0, 0)<br>(3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *)<br>(0, 0, 1, *) | (0, 0, 0, *)<br>(0, 0, 1, *) | (0, 0, 0, *)<br>(0, 0, 1, *) | (0, 0, 0, *)<br>(1, 0, 0, *) | (0, 0, 0, *)<br>(1, 0, 0, *) | (0, 0, 0, *)<br>(1, 0, 0, *) | (0, 0, 0, *)<br>(0, 0, 1, *) |
| 54 | (0, 0, 0, *)<br>(0, 0, 1, *)<br>(1, 0, 0, *) | (0, 0, 0, *)<br>(0, 0, 1, *)<br>(1, 0, 0, *) | (0, 0, 0, *)<br>(0, 0, 1, *)<br>(1, 0, 0, *) | (0, 0, 0, *)<br>(1, 0, 0, *)<br>(2, 0, 0, *) | (0, 0, 0, *)<br>(1, 0, 0, *)<br>(2, 0, 0, *) | (0, 0, 0, *)<br>(1, 0, 0, *)<br>(2, 0, 0, *) | (0, 0, 0, *)<br>(0, 0, 1, *)<br>(1, 0, 0, *) |
| 55 | (0, 0, 0, *)<br>(0, 0, 1, *)<br>(1, 0, 0, *)<br>(1, 0, 1, *) | (0, 0, 0, *)<br>(0, 0, 1, *)<br>(1, 0, 0, *)<br>(1, 0, 1, *) | (0, 0, 0, *)<br>(0, 0, 1, *)<br>(1, 0, 0, *)<br>(1, 0, 1, *) | (0, 0, 0, *)<br>(1, 0, 0, *)<br>(2, 0, 0, *)<br>(3, 0, 0, *) | (0, 0, 0, *)<br>(1, 0, 0, *)<br>(2, 0, 0, *)<br>(3, 0, 0, *) | (0, 0, 0, *)<br>(1, 0, 0, *)<br>(2, 0, 0, *)<br>(3, 0, 0, *) | (0, 0, 0, *)<br>(0, 0, 1, *)<br>(1, 0, 0, *)<br>(1, 0, 1, *) |
| 56 | (0, 0, 0, *)<br>(0, 0, 1, *)<br>(1, 0, 0, *)<br>(1, 0, 1, *)<br>(2, 0, 0, *) | (0, 0, 0, *)<br>(0, 0, 1, *)<br>(1, 0, 0, *)<br>(1, 0, 1, *)<br>(2, 0, 0, *) | (0, 0, 0, *)<br>(0, 0, 1, *)<br>(1, 0, 0, *)<br>(1, 0, 1, *)<br>(2, 0, 0, *) | (0, 0, 0, *)<br>(1, 0, 0, *)<br>(2, 0, 0, *)<br>(3, 0, 0, *)<br>(4, 0, 0, *) | (0, 0, 0, *)<br>(1, 0, 0, *)<br>(2, 0, 0, *)<br>(3, 0, 0, *)<br>(4, 0, 0, *) | (0, 0, 0, *)<br>(1, 0, 0, *)<br>(2, 0, 0, *)<br>(3, 0, 0, *)<br>(4, 0, 0, *) | (0, 0, 0, *)<br>(0, 0, 1, *)<br>(1, 0, 0, *)<br>(1, 0, 1, *)<br>(2, 0, 0, *) |
| 57 | (0, 0, 0, *)<br>(0, 0, 1, *)<br>(1, 0, 0, *)<br>(1, 0, 1, *)<br>(2, 0, 0, *)<br>(2, 0, 1, *) | (0, 0, 0, *)<br>(0, 0, 1, *)<br>(1, 0, 0, *)<br>(1, 0, 1, *)<br>(2, 0, 0, *)<br>(2, 0, 1, *) | (0, 0, 0, *)<br>(0, 0, 1, *)<br>(1, 0, 0, *)<br>(1, 0, 1, *)<br>(2, 0, 0, *)<br>(2, 0, 1, *) | (0, 0, 0, *)<br>(1, 0, 0, *)<br>(2, 0, 0, *)<br>(3, 0, 0, *)<br>(4, 0, 0, *)<br>(5, 0, 0, *) | (0, 0, 0, *)<br>(1, 0, 0, *)<br>(2, 0, 0, *)<br>(3, 0, 0, *)<br>(4, 0, 0, *)<br>(5, 0, 0, *) | (0, 0, 0, *)<br>(1, 0, 0, *)<br>(2, 0, 0, *)<br>(3, 0, 0, *)<br>(4, 0, 0, *)<br>(5, 0, 0, *) | (0, 0, 0, *)<br>(0, 0, 1, *)<br>(1, 0, 0, *)<br>(1, 0, 1, *)<br>(2, 0, 0, *)<br>(2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

In [Table 5], four pairs of each format ($f_{RA}, t_{RA}^{(0)}, t_{RA}^{(1)}, t_{RA}^{(2)}$) indicate the positions of specific random access resources. Herein, $f_{RA}$ indicates a frequency resource index in a considered time instance, $t_{RA}^{(0)}=0,1,2$ indicates whether corresponding resources are (re)generated in all of even-numbered radio frames or odd-numbered radio frames, $t_{RA}^{(1)}=0,1$ indicates whether random access resources are located in the first or second half frame, and $t_{RA}^{(2)}$ indicates the number of a UL subframe in which a preamble starts. UL subframe numbers start to be counted, starting from the first UL subframe between two contiguous DL-UL switch points as 0, and is excluded from preamble format 4. Herein, $t_{RA}^{(2)}$ is expressed as (*).

The start of random access preamble formats 0 to 3 is adjusted to the start of a UL subframe for which a UE estimates $N_{TA}=0$, and random access preamble 4 starts $4832 \cdot T_s$ before the end of a UpPTS. Herein, $N_{TA}$ indicates a time offset between a UL radio frame and a DL radio frame.

If time multiplexing is not sufficient to maintain all opportunities of each PRACH configuration needed for a specific density value $D_{RA}$, the opportunities are allocated to time resources in a time resource-first manner and then to frequency resources. For preamble formats 0 to 3, frequency multiplexing is performed according to [Equation 2].

$$n_{PRB}^{RA} = \begin{cases} n_{PRB\,offset}^{RA} + 6\left\lfloor \dfrac{f_{RA}}{2} \right\rfloor, & \text{if } f_{RA} \bmod 2 = 0 \\ N_{RB}^{UL} - 6 - n_{PRB\,offset}^{RA} - 6\left\lfloor \dfrac{f_{RA}}{2} \right\rfloor, & \text{otherwise} \end{cases} \quad \text{[Equation 2]}$$

In [Equation 2], $N_{RB}^{UL}$ represents the number of UL RBs, $n_{PRB}^{RA}$ represents the first PRB allocated to a PRACH opportunity, and $n_{PRB\ offset}^{RA}$ represents the first PRB available for a PRACH expressed as the number of PRBs configured by a higher layer, satisfying $0 \leq n_{PRBoffset}^{RA} \leq N_{RB}^{UL}-6$.

For preamble format 4, frequency multiplexing is performed according to [Equation 3].

$$n_{PRB}^{RA} = \begin{cases} 6f_{RA}, & \text{if } ((n_f \bmod 2) \times (2-N_{SP}) + t_{RA}^{(1)}) \bmod 2 = 0 \\ N_{RB}^{UL} - 6(f_{RA}+1), & \text{otherwise} \end{cases}$$

[Equation 3]

In [Equation 3], $n_f$ indicates a system frame number and $N_{SP}$ indicates the number of DL-UL switch points in a radio frame.

For two frame structure types 1 and 2, each radio access preamble has a bandwidth corresponding to 6 contiguous RBs.

3.4 Method for Generating RACH Preamble

Now, a method for generating an RACH preamble will be described below. A random access preamble (i.e., an RACH preamble) is generated from a Zadoff Chu (ZC) sequence including a Zero Correlation Zone (ZCZ) generated from one or more Root Zadoff Chu (RZC) sequences. A network configures a set of preamble sequences allowed for a UE.

64 preambles are available for each cell. A set of 64 preamble sequences including all possible cyclic shifts of an RZC sequence for a logical index RACH_ROOT_SEQUENCE are searched for in an ascending order of cyclic shifts in the cell. The root index RACH_ROOT_SEQUENCE is broadcast as part of system information. If the 64 preambles are not generated from a single RZC, additional preamble sequences may be acquired from root indexes successive to the corresponding root index until 64 sequences are all detected. The root indexes are cyclically repeated from logical index 0 to logical index 837. For the relationship between logical root sequence indexes and physical root sequence indexes u, refer to [Table 9] and [Table 10] which will be described later.

A $u^{th}$ RZC sequence is defined by [Equation 4].

$$x_u(n) = e^{-j\frac{\pi u n(n+1)}{N_{ZC}}}, \quad 0 \leq n \leq N_{ZC}-1$$

[Equation 4]

The length $N_{ZC}$ of a ZC sequence is given in [Table 6]. A random access preamble having a ZCZ of length $N_{CS}-1$, $X_{u,v}(n)$ is defined from the $u^{th}$ RZC sequence using a cyclic shift as expressed in [Equation 5].

$$x_{u,v}(n) = x_u((n+C_v) \bmod N_{ZC})$$

[Equation 5]

A cyclic shift $C_v$ used in [Equation 5] is given by [Equation 6].

For preamble formats 0 to 4, $N_{CS}$ is given in [Table 7] and [Table 8]. A ZCZ configuration parameter is provided by a higher layer. A high-speed flag parameter provided by the higher layer indicates whether $C_v$ is selected from a restricted set or an unrestricted set. A parameter $d_u$ indicates a cyclic shift corresponding to a Doppler shift size $1/T_{SEQ}$ having a spacing of one subcarrier, given by the following equation.

$$d_u = \begin{cases} p & 0 \leq p < N_{ZC}/2 \\ N_{ZC}-p & \text{otherwise} \end{cases}$$

[Equation 7]

In [Equation 7], the parameter p is a smallest non-negative integer satisfying $(pu) \bmod N_{ZC}=1$. A parameter for a restricted set of cyclic shifts depends on $d_u$. If $N_{CS} \leq d_u < N_{ZC}/3$, parameters for the restricted set are given as [Equation 8].

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor N_{ZC}-2d_u-n_{group}^{RA}d_{start})/N_{CS} \rfloor, 0)$$

[Equation 8]

If $N_{ZC}/3 \leq d_u \leq (N_{ZC}-N_{CS})/2$, the parameters for the restricted set are given as [Equation 9].

$$n_{shift}^{RA} = \lfloor (N_{ZC}-2d_u)/N_{CS} \rfloor$$

$$d_{start} = N_{ZC}-2d_u+n_{shift}^{RA} N_{CS}$$

$$n_{group}^{RA} = \lfloor d_u/d_{start} \rfloor$$

$$\bar{n}_{shift}^{RA} = \min(\max(\lfloor d_u-n_{group}^{RA}d_{start})/N_{CS} \rfloor,0), n_{shift}^{RA})$$

[Equation 9]

For all other values of $d_u$, no cyclic shift exists in the restricted set.

[Table 6] below lists the lengths of a random access preamble sequence for preamble formats.

TABLE 6

| Preamble format | $N_{ZC}$ |
|---|---|
| 0-3 | 839 |
| 4 | 139 |

[Table 7] below illustrates a mapping relationship between ZCZ configurations and cyclic shift values $N_{CS}$ required for generating a random access preamble used in a restricted set or an unrestricted set, for preamble formats 0 to 3. Herein, $N_{CS}$ is the length of a base ZC sequence.

[Equation 6]

$$C_v = \begin{cases} vN_{CS} & v=0,1,\ldots,\lfloor N_{ZC}/N_{CS} \rfloor -1, N_{CS} \neq 0 & \text{for unrestricted sets} \\ 0 & N_{CS}=0 & \text{for unrestricted sets} \\ d_{start}\lfloor v/n_{shift}^{RA} \rfloor + (v \bmod n_{shift}^{RA})N_{CS} & v=0,1,\ldots,n_{shift}^{RA}n_{group}^{RA}+\bar{n}_{shift}^{RA}-1 & \text{for restricted sets} \end{cases}$$

TABLE 7

| zeroCorrelationZoneConfig | $N_{CS}$ value Unrestricted set | $N_{CS}$ value Restricted set |
|---|---|---|
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 8

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

[Table 8] illustrates a mapping relationship between ZCZ configurations used for preamble format 4 and $N_{CS}$ values used for generation of RACH preambles.

[Table 9] lists the orders of root ZC sequences for preamble formats 0 to 3.

TABLE 9

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |

TABLE 9-continued

| Logical root sequence number | Physical root sequence number u (in increasing order of the corresponding logical sequence number) |
|---|---|
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

[Table 10] lists the order of root ZC sequences for preamble format 4.

TABLE 10

| Logical root sequence number | Physical root sequence number u (in increasing order of the corresponding logical sequence number) | | | | | | | | | | | | | | | | | | |
|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | |

3.5 PRACH Parameters

Parameters required to generate a PRACH preamble will be described below.

The PRACH parameters are indicated to a UE by higher-layer signaling (e.g., RRC signaling or MAC signaling). For example, a PRACH-ConfigSIB Information Element (IE) and a PRACH-Config IE are used to explicitly indicate a PRACH configuration (i.e. PRACH parameters) in system information and mobility control information. Particularly, the PRACH-Config IE is transmitted in System Information Block 2 (SIB2). [Table 11] illustrates an example of the PRACH-Config IE.

will be transmitted. A rootSequenceIndex parameter indicates a root ZC sequence. A zeroCorrelationZoneConfig parameter indicates a cyclic shift value $N_{CS}$.

4. Initial Access Procedure

An initial access procedure may include a cell search procedure, a system information acquisition procedure, and a random access procedure which is described in section 3. The embodiments of the present invention relate to an initial access procedure performed in an ultrahigh frequency band and a new initial access procedure faster than a conventional

TABLE 11

```
-- ASN1START
PRACH-ConfigSIB ::=            SEQUENCE {
        rootSequenceIndex             INTEGER (0..837),
        prach-ConfigInfo             PRACH-ConfigInfo
}
PRACH-Config ::=              SEQUENCE {
        rootSequenceIndex             INTEGER (0..837),
        prach-ConfigInfo             PRACH-ConfigInfo
                        OPTIONAL  -- Need ON
}
PRACH-ConfigSCell-r10 ::=         SEQUENCE {
        prach-ConfigIndex-r10                    INTEGER
(0..63)
}
PRACH-ConfigInfo ::=           SEQUENCE {
        prach-ConfigIndex             INTEGER (0..63),
        highSpeedFlag                  BOOLEAN,
        zeroCorrelationZoneConfig    INTEGER (0..15),
        prach-FreqOffset              INTEGER (0..94)
}
-- ASN1STOP
```

In [Table 11], a highSpeedFlag parameter indicates whether cyclic shifts used for generation of RACH preambles are from a restricted set or an unrestricted set. A Prach-ConfiguIndex parameter specifies a PRACH configuration and a preamble format. A prach-FreqOffset parameter indicates a frequency position at which an RACH preamble cellular system is needed. Using the new initial access procedure, the UE may transmit and receive data through fast access to the eNB and overall cell throughput can be improved.

Figure 10:
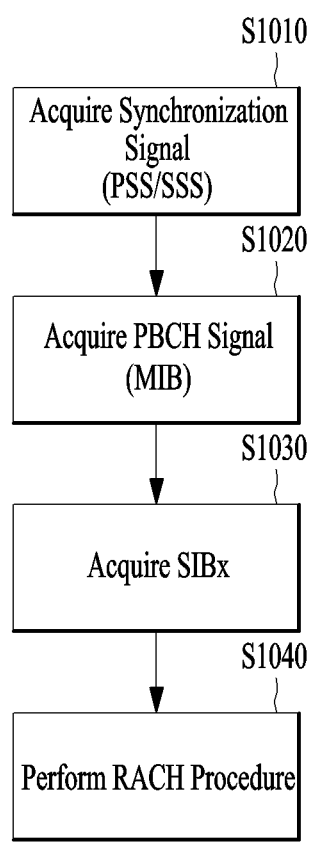
FIG. 10 illustrates an example of an initial access procedure used in an LTE/LTE-A system.

FIG. 10 illustrates an example of an initial access procedure used in an LTE/LTE-A system.

A UE may acquire DL synchronization information by receiving synchronization signals (e.g. a Primary Synchronization Signal (PSS) and a Secondary Synchronization Signal (SSS)) transmitted by an eNB. The synchronization signals are transmitted twice in every frame (in units of 10 ms) (S1010).

The DL synchronization information obtained in step S1010 may include a Physical Cell ID (PCID), DL time and frequency synchronization information, and Cyclic Prefix (CP) length information.

Next, the UE receives a PBCH signal transmitted through a PBCH. The PBCH signal is repeatedly transmitted four times during four frames (i.e. 40 ms) (S1020).

The PBCH signal includes a Master Information Block (MIB) as one type of system information. One MIB is a total of 24 bits in size and 14 bits among the 24 bits are used to indicate Physical HARQ Indicator Channel (PHICH) configuration information, DL cell bandwidth, and a System Frame Number (SFN). The other 10 bits are reserved as spare bits.

Thereafter, the UE may acquire other system information by receiving different System Information Blocks (SIBs) transmitted by the eNB. The SIBs are transmitted on a DL-SCH. Whether the SIBs are present or not is checked by PDCCH signals masked with System Information Radio Network Temporary Identifiers (SI-RNTIs) (S1030).

Among the SIBs, SIB type 1 (SIB1) includes parameters necessary for determining whether a corresponding cell is suitable for cell selection and information about scheduling for other SIBs in the time domain. SIB type 2 (SIB2) includes common channel information and shared channel information. SIB type 3 (SIB3) to SIB type 8 (SIB8) include cell reselection related information and information about inter-frequency and intra-frequency. SIB type 9 (SIBS) is used to signal the name of a Home eNodeB (HeNB) and SIB type 10 (SIB10) to SIB type 12 (SIB12) include Earthquake and Tsunami Warning Service (ETWS) notifications message and a Commercial Mobile Alert System (CMAS) warning messages. SIB type 13 (SIB13) includes Multimedia Broadcast Multicast Service (MBMS) related control information.

The UE may perform a random access (i.e. RACH) procedure after performing steps S1010 to S1030. Particularly, the UE may acquire parameters for transmitting a Physical Random Access Channel (PRACH) signal upon receiving SIB2 among the SIBs. Therefore, the UE may perform the RACH procedure with the eNB by generating and transmitting the PRACH signal using parameters included in SIB2 (S1040).

Figure 11:
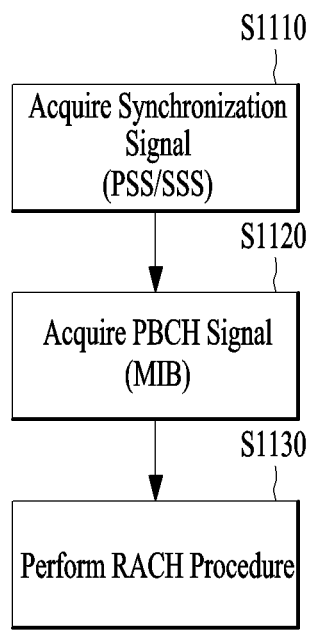
FIG. 11 illustrates an example of an initial access procedure that can be used in embodiments of the present invention.

FIG. 11 illustrates an example of an initial access procedure that can be used in embodiments of the present invention.

With reference to FIG. 10, a method for generating a PRACH preamble after receiving SIB2 has been described. However, since SIB2 has a transmission period of 160 ms, the UE may receive SIB2 after a maximum of 16 frames after receiving the PSS. A wireless access system supporting an ultrahigh frequency band may be sensitive to a variation of a frequency offset caused by a Doppler effect according to time. Therefore, a time corresponding to a maximum of 160 ms may be problematic when the UE performs an RACH procedure.

Accordingly, a new initial access procedure capable of immediately performing the RACH procedure even though only the synchronization signals and the PBCH signal are received is needed so as to be suitable for a wireless environment of an ultrahigh frequency band.

Steps S1110 and S1120 of FIG. 11 are the same as steps S1010 and S1020 of FIG. 10 and, therefore, a corresponding description may refer to FIG. 10. In FIG. 11, the UE immediately performs the RACH procedure without receiving SIB messages. Therefore, the UE should obtain parameters transmitted through SIB2 by a new scheme. PRACH parameters transmitted through the SIB are as follows.

(1) Prach-ConfigIndex: A PRACH configuration index parameter is a size of 6 bits and indicates a PRACH configuration and a preamble format.

(2) prach-FreqOffset: A PRACH frequency offset parameter is a size of 6 bits and indicates a frequency position at which an RACH preamble is to be transmitted.

(3) rootSequenceIndex: A root sequence index parameter is a size of 10 bits and is used to indicate a root ZC sequence.

(4) zeroCorrelationZoneConfig: A Zero Correlation Zone (ZCZ) configuration parameter is a size of 4 bits and is used to indicate configuration of a cyclic shift value $N_{CS}$.

(5) highSpeedFlag: A high-speed flag parameter is a size of 1 bit and is used to represent whether cyclic shifts used to generate an RACH preamble are given in a restricted set or an unrestricted set.

In FIG. 11, the UE may acquire parameters transmitted through an SIB2 message using various methods described below without receiving the SIB2 message. Therefore, the UE may perform the RACH procedure immediately after obtaining a PBCH signal, thereby rapidly performing the initial access procedure (S1130).

Hereinafter, various methods of obtaining the above-described parameters without the SIB2 message will be described.

4.1 PRACH Configuration Index Parameter Acquisition Method 4.1.1 Preamble Format Fixing Method In a current cellular network, various preamble formats are supported to guarantee various preamble formats. However, in the case of a small cell, cell coverage is relatively very narrow (e.g. about 1 km to 3 km) in comparison with a cellular network. Therefore, the small cell does not require various RACH preamble formats according to cell coverage and may perform the RACH procedure using only a specific preamble format supporting a small cell radius.

For example, a preamble format for fast initial access may be fixed in a system to use only preamble format 0 described in Table 2 in the case of FDD and use only preamble format 4 in the case of TDD. Alternatively, preamble format 4 supporting the smallest cell coverage may be fixedly used irrespective of FDD or TDD.

The PRACH configuration index parameter includes information about an RACH preamble format type and a system frame number (odd number or even number) and subframe number in which an RACH preamble can be transmitted. If the preamble format is fixedly used as described above, the system frame number and a subframe number may also use fixed positions as system-wise parameters.

4.1.2 BCH Signal Use Method

Alternatively, a PARCH configuration index may be transmitted using spare bits of a PBCH signal by abbreviating the number of PRACH configurations. For example, assuming that preamble format 0 is fixedly used, the PRACH configuration index described in Table 3 may be reconfigured as shown in Table 12.

TABLE 12

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |

As shown in Table 12, a total of 4 information bits is needed to reconfigure the PRACH configuration index. In this case, the number of PRACH configurations can be abbreviated by using other preamble formats in consideration of cell coverage properties. Table 12 shows an exemplary PRACH configuration in an FDD system and, even in the case of a TDD system, the PRACH configuration can be abbreviated through a similar method.

4.2 PRACH Frequency Offset Acquisition Method

The PRACH frequency offset parameter is used to avoid interference between neighboring cells as information indicating a frequency position at which a PRACH is to be transmitted. Therefore, the eNB may inform the UE of different frequency positions as the frequency offset parameter in order to avoid inter-cell interference and may cause the UE to perform fast access.

4.2.1 Frequency Offset Fixing Method

In the case of a small cell in a radio system supporting an ultrahigh frequency band, a frequency position may be fixedly used as a system-wise parameter. In this case, fast initial access can be performed through the simplest method although inter-cell interference avoidance is difficult to achieve.

4.2.2 BCH Signal Use Method

The PRACH frequency offset parameter may be transmitted using reserved bits of a BCH by abbreviating the number of PRACH frequency position configurations. For example, a PRACH frequency offset value expressed by 6 bits may be expressed as an offset value of 4 bits. In this case, the PRACH frequency offset of 6 bits may be transmitted using the BCH signal without abbreviating the PRACH frequency offset parameter or the PRACH frequency offset configured by bits less than 4 bits may be transmitted.

4.2.3 Cell ID Association Method

The PRACH frequency offset may be handled in association with a cell ID detected through a PSS and an SSS. Currently, three cell IDs in a cell ID group are detected using the PSS and 168 cell ID groups are detected using the SSS. Accordingly, a total of 504 Physical Cell IDs (PCIDs) may be detected using the PSS/SSS.

Since the PRACH frequency offset value is expressed as 0 to 94, the frequency position offset value may be implicitly indicated to the UE in the form of Equation 10.

$$\text{PRACH frequency offset} = (\text{Physical cell ID}) \bmod (95) \quad [\text{Equation 10}]$$

Alternatively, a cell ID group detected through the SSS may be detected by modulo operation using the PRACH frequency offset. Alternatively, the frequency offset value may be expressed using a new function as frequency offset=function(physical cell ID).

4.2.4 PCFICH Association Method

The PRACH frequency offset parameter may be handled in association with a frequency position at which a PCFICH is transmitted. Accordingly, a frequency region in which an RACH preamble is to be transmitted may be determined as indicated by Equation 11.

$$(N_{sc}^{RB}/2) \cdot (N_{ID}^{cell} \bmod 2N_{RB}^{DL}) \quad [\text{Equation 11}]$$

In this case, $N_{sc}^{RB}$ is the number of subcarriers indicating the size of an RB in the frequency domain, $N_{ID}^{cell}$ is a PCID, and $N_{RB}^{DL}$ is a DL bandwidth configuration expressed as a multiple of $N_{sc}^{RB}$.

Alternatively, the frequency region may be designated by newly setting the PRACH frequency offset value. The frequency offset value may be indicated by a BCH signal or may be fixed to a system parameter.

4.3 Root Sequence Index and Cyclic Shift Parameter Acquisition Method 4.3.1 Root Sequence Index and Cyclic Shift Parameter Fixing Method A root sequence index and a cyclic shift parameter (i.e. ZCZ configuration parameter) may be fixedly operated as system-wise parameters. In this case, fast initial access can be performed by the simplest method although inter-cell interference avoidance is difficult to achieve.

4.3.2 BCH Signal Use Method

The root sequence index and the cyclic shift may be transmitted using reserved bits of a BCH signal by abbreviating the number of configurations of the root sequence index and the cyclic shift. For example, the root sequence indexes 0 to 837 expressed by a size of 10 bits described in Table 9 may be abbreviated to the number of available candidates in an ultrahigh frequency band. For example, if the root sequence indexes are restricted to the number of available logical root sequence indexes as shown in Table 13, the root sequence indexes may be expressed by a total of 6 bits and may be abbreviated to other forms according to the size of a small cell to be covered.

TABLE 13

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |

In addition, the cyclic shift parameter may be abbreviated to be transmitted using 2 bits rather than existing 4 bits. Table 14 shows an example of a cyclic shift value set as widely as possible in order to minimize the influence of the Doppler effect. Accordingly, the cyclic shift parameter may be configured using a constant value of other forms.

TABLE 14

| zeroCorrelationZoneConfig | $N_{CS}$ value | |
| --- | --- | --- |
| | Unrestricted set | Restricted set |
| 0 | 0 | 15 |
| 1 | 22 | 32 |
| 2 | 46 | 68 |
| 3 | 119 | 158 |

4.3.3 PSS Association Method

Root indexes used in a PSS may be used to determine the root sequence index. For example, the UE may use a root sequence index used in a detected PSS as a root sequence index for transmitting a PRACH. In this case, a cyclic shift value may be fixed to a system-wise parameter or may use a cyclic shift value associated with the root sequence index used in the PSS.

For example, when the root sequence index used in the PSS is given as indicated in Table 15, a root index used to generate a PRACH preamble is the same as the root index used in the PSS and a cyclic shift value indicated by a ZCZ configuration parameter may be mapped as indicated in Table 15.

TABLE 15

| PSS Root index | PRACH root index | Cyclic shift |
| --- | --- | --- |
| 25 | 25 | 0 |
| 29 | 29 | 22 |
| 34 | 34 | 46 |

That is, upon receiving the PSS, the UE may implicitly acquire a PRACH root index and a cyclic shift value as shown in Table 15.

4.4 Fast Flag Parameter Acquisition Method 4.4.1 Fast Flag Parameter Fixing Method A small cell supporting an ultrahigh frequency band may not consider a UE moving at a high speed in consideration of cell coverage. Accordingly, a system may be designed without considering a restricted set of cyclic shifts supported for the UE moving at a high speed. In the embodiments of the present invention, the UE may generate an RACH preamble considering only an unrestricted set. That is, a fast flag parameter may be set as a system-wise parameter.

4.4.2 BCH Signal Use Method

Even in the case of a small cell supporting an ultrahigh frequency band, the fast flag parameter is desirably used when the UE moving at a high speed is considered. The eNB may transmit the fast flag parameter to the UE using reserved bits of a BCH signal.

4.5 As described in section 4, the PRACH parameters included in SIB2 may be fixedly used in a system, may be transmitted in a BCH signal, or may be used in association with a synchronization signal (PSS/SSS). If the PRACH parameters are included in the BCH signal, the parameters may be configured to be used in the ultrahigh frequency band as described above.

The methods described in section 4 may be used by a combination thereof or may be selectively used. For example, the methods described in sections 4.1. to 4.4. may be used individually or in combination, so that the UE may perform step S1130 by generating the RACH preamble without receiving SIB messages in FIG. 11.

5. Apparatuses

Figure 12:
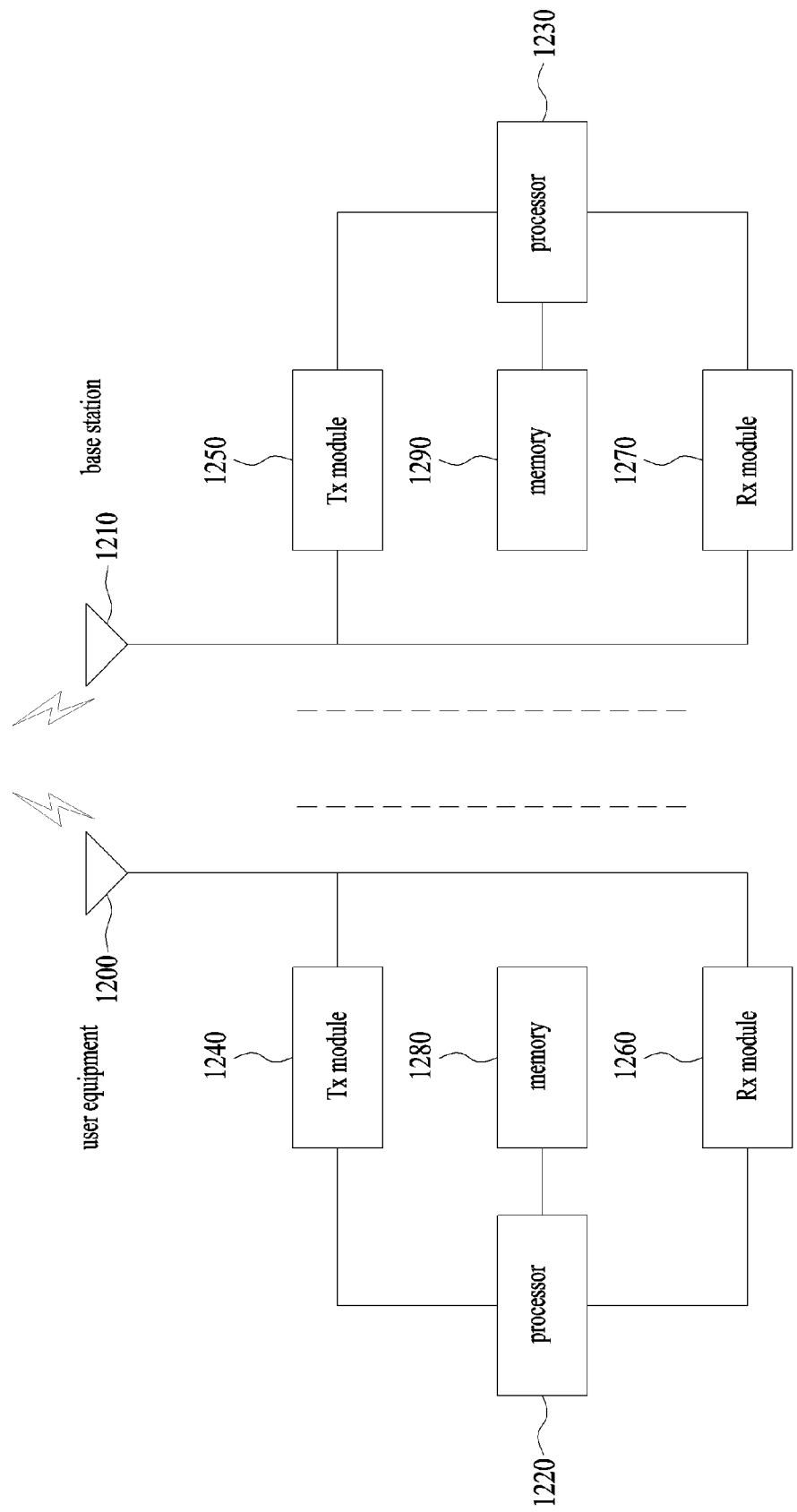
FIG. 12 illustrates means that can implement the methods described with reference to FIGS. 1 to 11.

Apparatuses illustrated in FIG. 12 are means that can implement the methods described before with reference to FIGS. 1 to 11.

A UE may act as a transmitter on a UL and as a receiver on a DL. A BS may act as a receiver on a UL and as a transmitter on a DL.

That is, each of the UE and the BS may include a Transmission (Tx) module 1240 or 1250 and a Reception (Rx) module 1260 or 1270, for controlling transmission and reception of information, data, and/or messages, and an antenna 1200 or 1210 for transmitting and receiving information, data, and/or messages.

Each of the UE and the BS may further include a processor 1220 or 1230 for implementing the afore-described embodiments of the present invention and a memory 1280 or 1290 for temporarily or permanently storing operations of the processor 1220 or 1230.

The embodiments of the present disclosure may be performed using the components and functions of the UE and the eNB. For example, the processor of the eNB may fixedly use the parameters included in SIB2 message or may transmit the parameters to the UE using the BCH signal, by combining the methods described in sections 1 to 4. The UE may generate the PRACH preamble using the fixed PRACH parameters or may perform the RACH procedure by implicitly or explicitly acquiring the PRACH parameters associated with the BCH or the PSS/SSS.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 12 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1280 or 1290 and executed by the processor 1220 or 1230.

The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for performing a fast initial access procedure in a wireless access system supporting an ultrahigh frequency band, the method comprising:
receiving a synchronization signal;
receiving a broadcast channel signal;
generating a Random Access Channel (RACH) preamble using prefixed Physical Random Access Channel (PRACH) parameters including cyclic shift values selected from only an unrestricted set; and
transmitting the generated RACH preamble based on the synchronization signal and the broadcast channel signal.

2. The method according to claim 1,
wherein the PRACH parameters further include one or more of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

3. A method for performing a fast initial access procedure in a wireless access system supporting an ultrahigh frequency band, the method comprising:
receiving a synchronization signal;
receiving a broadcast channel signal through a physical broadcast channel (PBCH);
if the broadcast channel signal includes one or more Physical Random Access Channel (PRACH) parameters, generating a Random Access Channel (RACH) preamble based on the PRACH parameters and the synchronization signal; and
transmitting the generated RACH preamble.

4. The method according to claim 3, wherein the one or more PRACH parameters include at least one of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

5. The method according to claim 3,
wherein the one or more PRACH parameters are received via reserved bits in the broadcast channel signal except for bits to which a master information block is mapped.

6. The method according to claim 3,
wherein a PRACH frequency offset parameter indicating a frequency position for transmitting the PRACH preamble is obtained using a cell identifier detected from the synchronization signal.

7. The method according to claim 3,
wherein a root sequence index parameter indicating a root Zadoff Chu (ZC) sequence and a Zero Correlation Zone (ZCZ) configuration parameter indicating a cyclic shift value are obtained from a root index of the synchronization signal.

8. A User Equipment (UE) for performing a fast initial access procedure in a wireless access system supporting an ultrahigh frequency band, the UE comprising:
a receiver:
a transmitter; and
a processor configured to perform the fast initial access procedure performed in the ultrahigh frequency band,
wherein the processor is configured to
receive a synchronization signal and a broadcast channel signal through the receiver,
generate a Random Access Channel (RACH) preamble using prefixed Physical Random Access Channel (PRACH) parameters including cyclic shift values selected from only an unrestricted set, and
transmit the generated RACH preamble based on the synchronization signal and the broadcast channel signal through the transmitter.

9. The UE according to claim 8,
wherein the PRACH parameters further include one or more of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

10. A User Equipment (UE) for performing a fast initial access procedure in a wireless access system supporting an ultrahigh frequency band, the UE comprising:
a receiver:
a transmitter; and
a processor configured to perform the fast initial access procedure performed in the ultrahigh frequency band,
wherein the processor is configured to
receive a synchronization signal, and a broadcast channel signal through a physical broadcast channel (PBCH), through the receiver,
if the broadcast channel signal includes one or more Physical Random Access Channel (PRACH) parameters, generate a Random Access Channel (RACH)

preamble based on the PRACH parameters and the synchronization signal, and transmit the generated RACH preamble through the transmitter.

11. The UE according to claim 10, wherein the one or more PRACH parameters include at least one of a PRACH configuration index parameter indicating a PRACH configuration and an RACH preamble format, a PRACH frequency offset parameter indicating a frequency position at which the RACH preamble is to be transmitted, a root sequence index parameter indicating a root Zadoff Chu (ZC) sequence, a Zero Correlation Zone (ZCZ) configuration parameter indicating a cyclic shift value, and a fast flag parameter indicating whether cyclic shifts are selected from a restricted set or an unrestricted set.

12. The UE according to claim 10,
wherein the one or more PRACH parameters are received via reserved bits in the broadcast channel signal except for bits to which a master information block is mapped.

13. The UE according to claim 10,
wherein a PRACH frequency offset parameter indicating a frequency position for transmitting the PRACH preamble is obtained using a cell identifier detected from the synchronization signal.

14. The UE according to claim 10,
wherein a root sequence index parameter indicating a root Zadoff Chu (ZC) sequence and a Zero Correlation Zone (ZCZ) configuration parameter indicating a cyclic shift value are obtained from a root index of the synchronization signal.

* * * * *